United States Patent [19]

Hines et al.

[11] Patent Number: 4,753,528

[45] Date of Patent: Jun. 28, 1988

[54] LASER ARCHERY DISTANCE DEVICE

[75] Inventors: Robin H. Hines; Michael R. Glasscock; D. Bruce Johnson, all of Tullahoma; Paul L. Plummer, Nashville, all of Tenn.

[73] Assignee: Quantime, Inc., Tullahoma, Tenn.

[21] Appl. No.: 770,970

[22] Filed: Aug. 30, 1985

Related U.S. Application Data

[63] Continuation-in-part of Ser. No. 560,978, Dec. 13, 1983, Pat. No. 4,606,629.

[51] Int. Cl.[4] .......................... G01C 3/00; G01C 5/00; F41G 1/00
[52] U.S. Cl. ............................................. 356/1; 33/265
[58] Field of Search ...................... 33/265; 356/1, 3, 4, 356/5, 400

[56] References Cited

U.S. PATENT DOCUMENTS

| | | | |
|---|---|---|---|
| 2,788,701 | 4/1957 | Browning | 33/265 |
| 3,671,126 | 6/1972 | Erb | 356/1 |
| 4,441,810 | 4/1984 | Momose et al. | 356/1 |
| 4,589,773 | 5/1986 | Ido et al. | 356/1 |
| 4,606,629 | 8/1986 | Hines et al. | 33/265 |

Primary Examiner—M. H. Paschall
Attorney, Agent, or Firm—Cushman, Darby & Cushman

[57] ABSTRACT

A method and apparatus for determining distance from a bow to a target at which the bow is aimed in which a beam of collimated light from a laser is directed to the target and reflected to a linear photosensitive element mounted on the bow. The element and laser are positioned on the bow so that the linear position of the incident reflected beam varies with the target distance and the element produces an output indicating the position. A circuit receives that output and produces a display of the target distance.

8 Claims, 6 Drawing Sheets

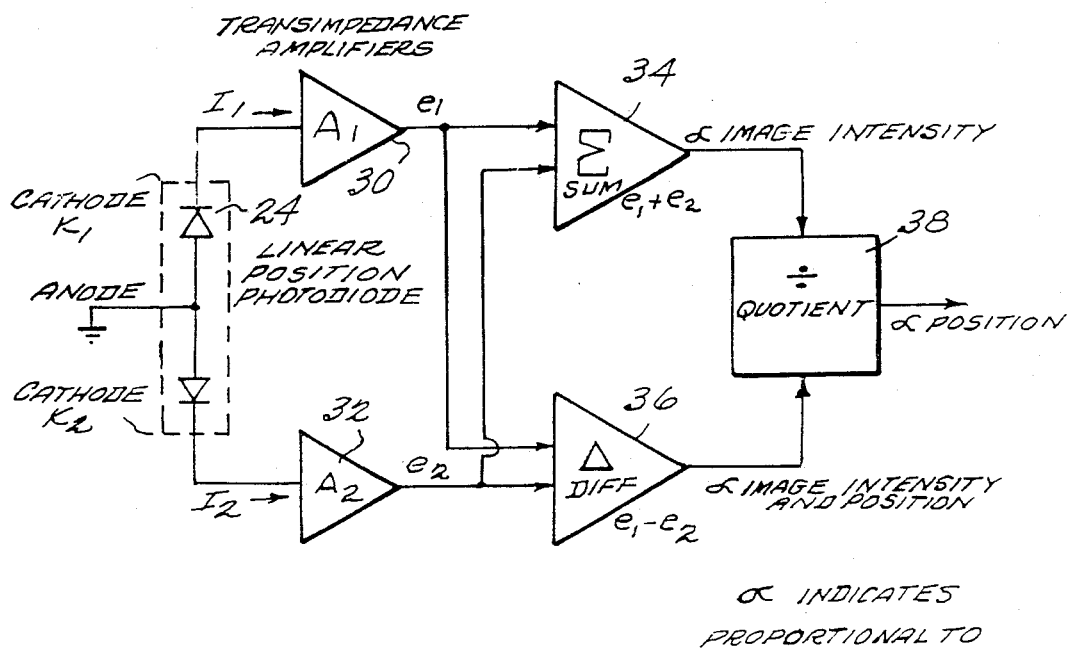

LASER ARCHERY DISTANCE DEVICE

This is a continuation-in-part (CIP) of application Ser. No. 560,978, filed Dec. 13, 1983, U.S. Pat. No. 4,606,629.

BACKGROUND OF THE INVENTION

The invention relates to a method and apparatus for determining the distance to an archery target.

The use of bow and arrow for game hunting or target shooting is one of the most popular recreational activities throughout the world. Indeed, more than $1 billion is spent each year on purchases of bows alone. In shooting beyond distances of approximately 15 yards, which is almost always required in game hunting, the accuracy of the shot is dependent upon the ability of the archer to adjust the drop of the arrow due to gravity. A skilled archer can accurately hit target distances within approximately 50 yards.

Several techniques have been employed in the past for aiding in effecting the required compensation. The most popular technique employs pins which are spaced apart on the bow. In theory, for a particular type animal such as a deer, the bow angle will be correct when a particular set of two pins are exactly bracketed by the back and belly of the animal. This technique is, however, extremely rough since it presupposes that animals are of the same size and that the pull of each hunter on the string will be the same. Manual optical stereoscopic sights such as used for hunting with guns have also been employed. Such sights are in practice too slow and cumbersome to be of benefit in archery hunting.

The present invention relates to a unique apparatus adapted for mounting on the bow for providing accurate indication to the hunter of the distance to a target. Once the hunter knows the exact distance to the target, he can readily determine from experience or written instructions what angle to the horizontal should be employed for a given pull of the string.

This is achieved by directing a beam of collimated light, preferably coherent radiation from a small solid state laser, to the target so that, when the bow is aimed at a target, light reflected from the target is received by a linear photosensitive element which produces an output indicating the position of the incident radiation in a linear direction. The element and laser are mounted so that the position along the element indicates the distance to the target. Appropriate circuitry is further provided to determine that distance and preferably to digitally display the same to the hunter.

Other objects and purposes of the invention will be clear from the following detailed description of the drawings.

BRIEF DESCRIPTION OF THE DRAWINGS

FIG. 5 shows a detailed schematic of a circuit for producing a signal indicating the linear position of the incident beam and hence the target distance;

DETAILED DESCRIPTION OF THE DRAWINGS

Figure 1:
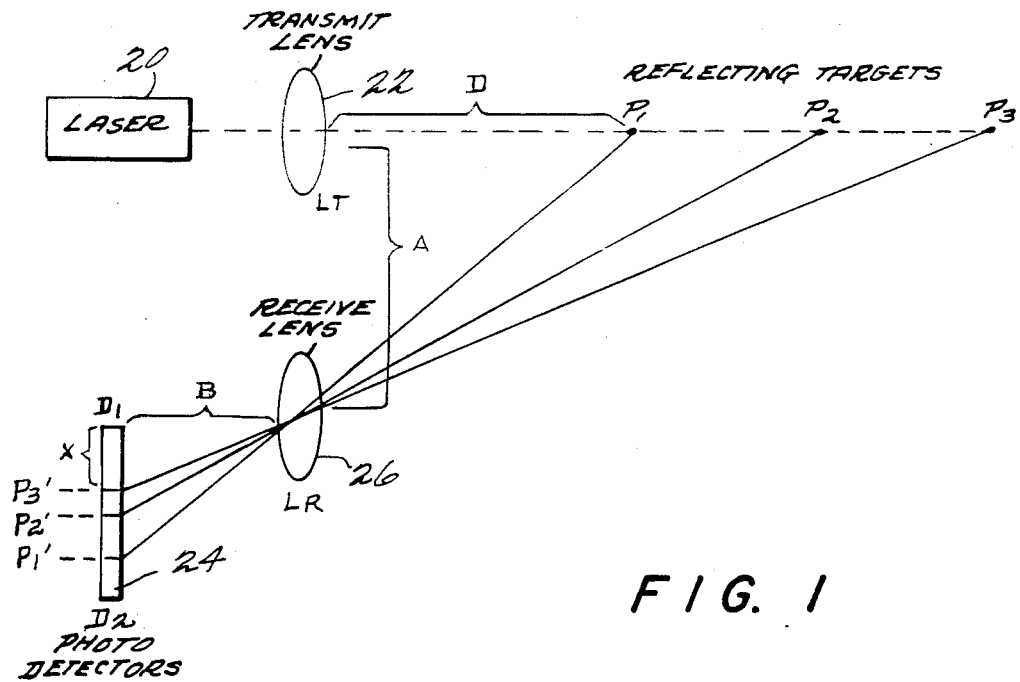
FIG. 1 shows a schematic view of the unique present invention illustrating the theory of operation thereof.

Reference is now made to FIG. 1 which illustrates schematically the operation of the present invention. Collimated light, preferably from a laser 20, is directed by a lens 22 toward a target at which the bow is aimed. Three targets $P_1$, $P_2$ and $P_3$ are shown in FIG. 1 at different distances from laser 20. Light reflected from a target at distance $P_1$ is reflected back to a linear photosensitive element 24 at an angle so that it is incident on photodetector element 24 via lens 26 at a location $P_1'$. A target at $P_2$ directs a reflection to element 24 via lens 26 to impinge at a different location $P_2'$, while reflected radiation distance $P_3$ is received on photodetector element 24 at location $P_3'$. Therefore, the position, D, of the target can be determined from the position, X, of the incident reflected radiation on the photosensitive element 24.

In FIG. 1, the dimension A is the separation distance between the transmit lens and the receive lens, B is the focal length of the receive lens, X is the distance the received image moves on the photosensor with respect to the optical axis as the target distance varies, and D is the target distance. By similar triangles, then $$D = \frac{AB}{X} \text{ and } X = \frac{AB}{D}$$

Figure 2:
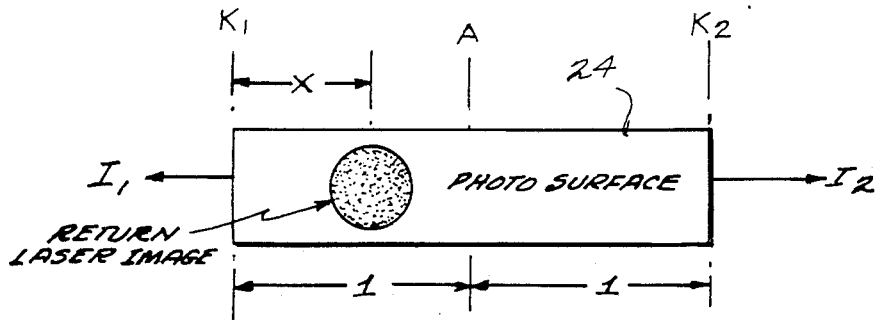
FIG. 2 shows a view of a linear photosensitive element.

Referring to FIG. 2, the linear photosensitive element is illustrated for the purpose of explaining the manner in which the position of the incident radiation on element 24 is determined. Any suitable linear photosensitive element can be employed and several types are available as off-the-shelf items.

In such a photodiode, the current output is both a function of the intensity of the incident radiation and its position. Assuming in FIG. 2 $I_1$ is the current through cathode $K_1$, then such current is proportional to the distance x from the edge of the photodiode and to the intensity S of the received light. Similarly, $I_2$ current through the other cathode $K_2$ is proportional to the distance $2-x$ and also to the intensity S of the received light. Thus, $I_1 \alpha Sx$ ($\alpha$ means proportional to)

$I_2 \alpha S(1+1-x) = 2S - xS$ $I_1 + I_2 = Sx + 2S - xS = 2S$ $I_1 - I_2 = SX - 2S + xS = 2S(x-1)$ so that $$\frac{I_1 - I_2}{I_1 + I_2} = \frac{2S(x-1)}{2S} = x - 1 \alpha x$$

Accordingly, the sum of the two currents is a function of the intensity of the received light and the ratio of the difference of the currents divided by the sum of the currents a function of the position x.

If a common amplifier is used for both currents so that the system gain, K, is the same for both signals, then an automatic gain control (AGC) is used to set $I_1$ at unity.

$$I_1 = 1 = KSx$$

$$\text{or, } K = \frac{1}{Sx}$$

$$\text{Then } I_2 = KS(2-x) = \frac{1}{Sx} S(2-x) = \frac{2}{x} - 1$$

$$= \frac{2D}{AB} - 1$$

With appropriate offsets and scale factors then, $$I_2' = I_2 + 1 = \frac{2D}{AB}$$

$$\text{and } I_2'' = I_2' \frac{AB}{2} = D$$

The output current $I_2''$ is then a direct linear function of the target distance when current $I_1$ is held constant with an AGC.

Figure 3:
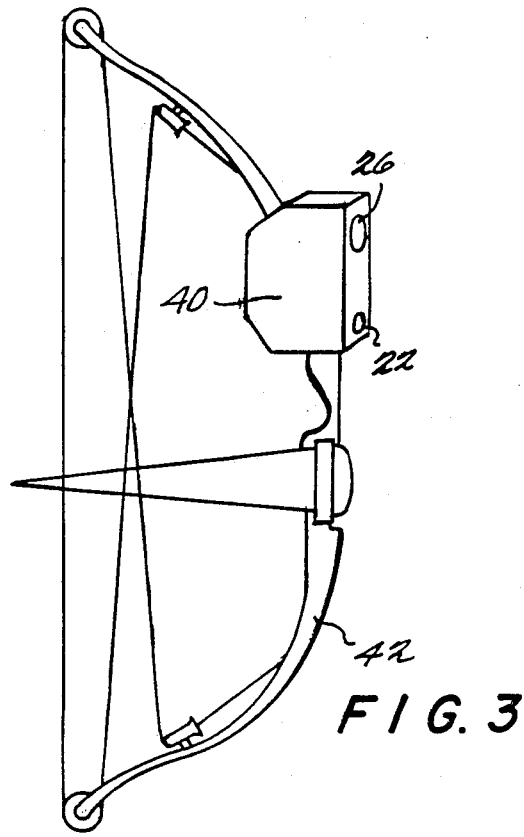
FIG. 3 shows a perspective view of the present invention mounted in place on a compound bow.
Figure 4A:
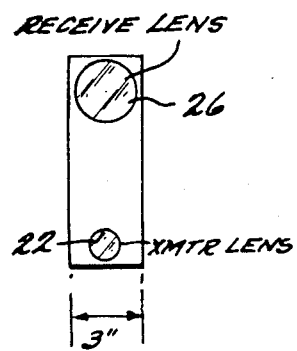
FIGS. 4a and 4b show, respectively, the side and front of the housing of the present invention as mounted in FIG. 3.
Figure 4B:
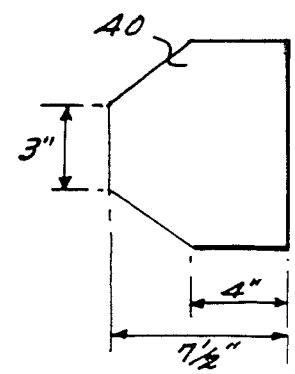

Referring to FIGS. 3, and 4a and 4b laser 20, element 26 and the associated circuitry are mounted within a housing 40 which is attached to the bow 42 as shown in FIG. 3. As can be seen in FIG. 4a, the lenses 22 and 26 respectively transmitting and receiving the laser radiation are mounted in linear separation as described above. The housing 40 may be of any suitable material and fastened to the bow in any suitable fashion.

Referring now to FIG. 5, currents $I_1$ and $I_2$ are respectively amplified in transimpedance amplifiers 30 and 32 with the outputs of each amplifier being applied respectively to a conventional summing amplifier 34 and to conventional difference amplifier 36. The respective outputs of amplifiers 34 and 36 are applied to a conventional dividing circuit 38 so that, as indicated, the output reflects the ratio therebetween and, accordingly, the position x.

Figure 6:
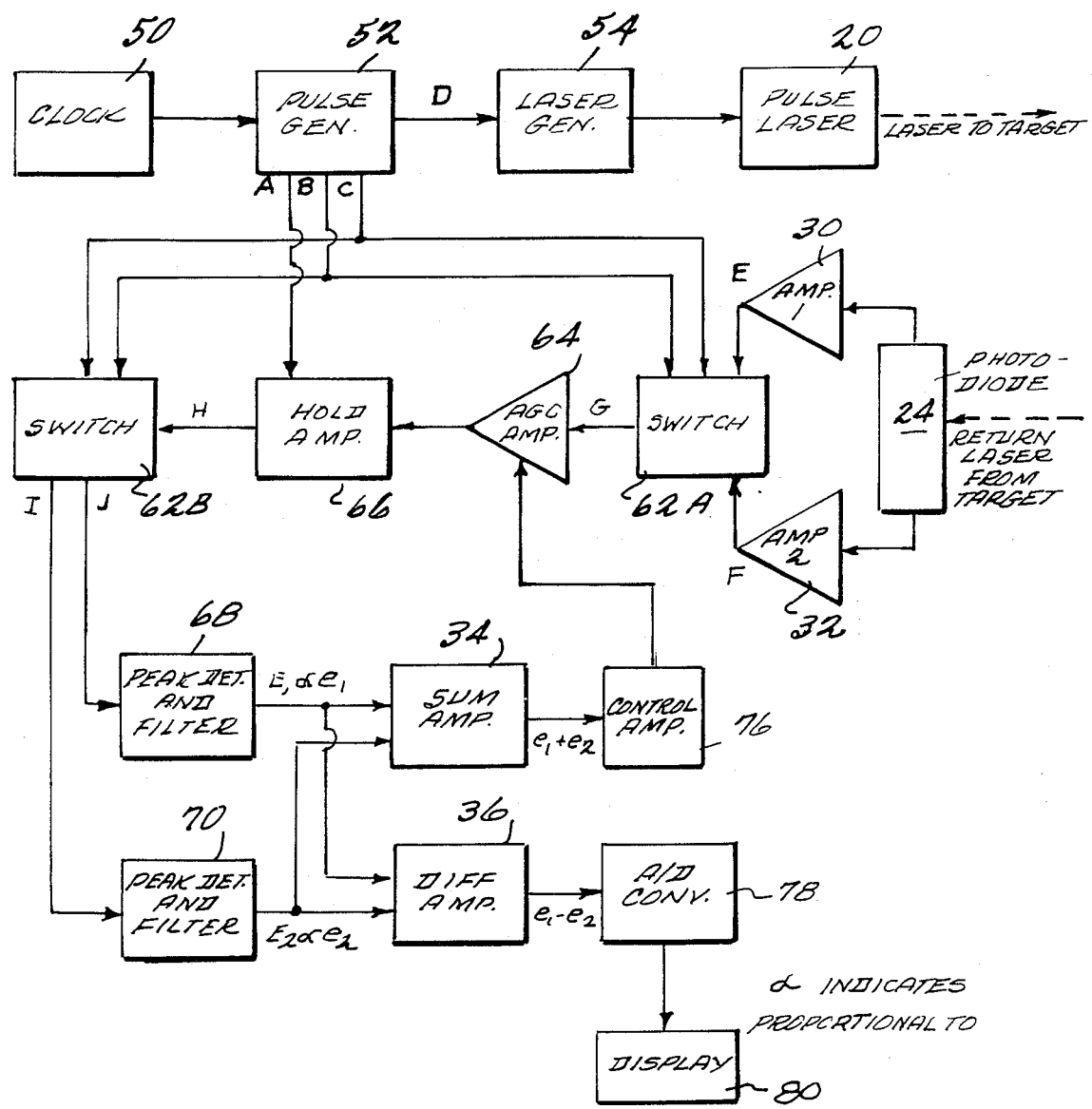
FIG. 6 shows a schematic view of another circuit for producing a digital display of the distance.

Reference is now made to FIG. 6 which illustrates another embodiment of the present invention. In this circuit, the sum of the amplitudes is used to control a gain control amplifier so that the sum is kept constant and, therefore, the difference directly indicates the position of the incident reflected radiation.

Figure 7:
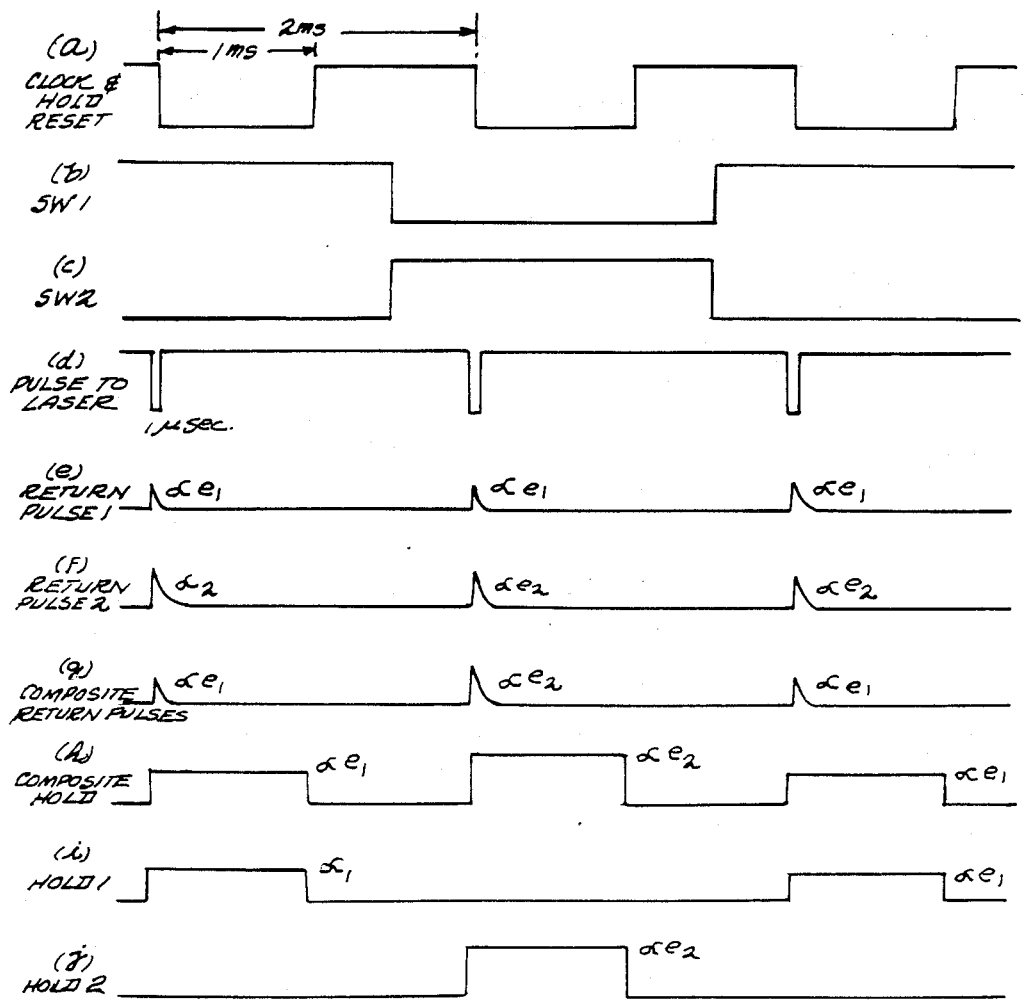
FIG. 7 shows a waveform diagram of the signals produced by the circuits of FIGS. 6 and 8.

A conventional clock 50, generating a basic timing square wave, as shown in FIG. 7, drives a pulse generator 52 in this embodiment. Pulse generator 52 in turn triggers a conventional laser driver 54 to drive solid state laser 20 so that it produces a sequence of pulses of approximately one microsecond at 500 pulses repetition. These pulses are directed to the target at which the bow is aimed, as discussed above.

The returned pulses are received by photodiode element 24 and the two current signals produced at cathodes $K_1$ and $K_2$ respectively applied to amplifiers 30 and 32. These amplifiers respectively convert currents $I_1$, $I_2$ into amplitudes $e_1$, $e_2$ proportional to the currents. Switch circuit 62A alternatively applies the outputs $e_1$, $e_2$ of amplifier 30 and 32 to an automatic gain control (AGC) amplifier 64 in accordance with the output of pulse generator 52 and as shown in FIG. 7.

The automatic gain control amplifier 64 is controlled by the sum of the signals from the element 24 so that the signal representing the difference indicates the distance to the target. Circuit 64 also compensates for the wide range of beam intensity received resulting from different target reflectivities and distances.

The output of AGC amplifier 64 is applied to a hold amplifier 66 which, as shown in FIG. 7(h) alternatively provides an output indicating the amplitude of the two currents from element 24. The hold signals are synchronized to the peak output of the return pulses. The use of a single hold circuit improves the circuit accuracy over one in which separate hold circuits are provided since there is no requirement to match the two hold circuits. The pulses are converted to a composite rectangular wave at the hold amplifier 66 and the signal separated by switch circuit 62B into two rectangular waves proportional to the current signals from element 24. These two signals are then converted to d.c. levels at peak detectors 68 and 70 and the d.c. levels applied respectively to the sum and difference amplifiers 34 and 36. Since the d.c. level has a discontinuity at the sample gate, the d.c. outputs are also filtered by circuits 68 and 70. As noted above, the output of sum amplifier 34 is applied to a control amplifier 76 which in turn controls automatic gain control amplifier 64 so that the output of difference amplifier 36 indicates the distance to the target. The output of amplifier 36 is applied to an analog-to-digital conversion circuit 78 which converts the analog signal to a BCD output. The output of circuit 78 is applied to a conventional digital display 80 mounted on the unit and viewable to the archer to indicate precisely the distance to the target at which he has aimed. Any suitable display in that regard can be utilized.

Figure 8:
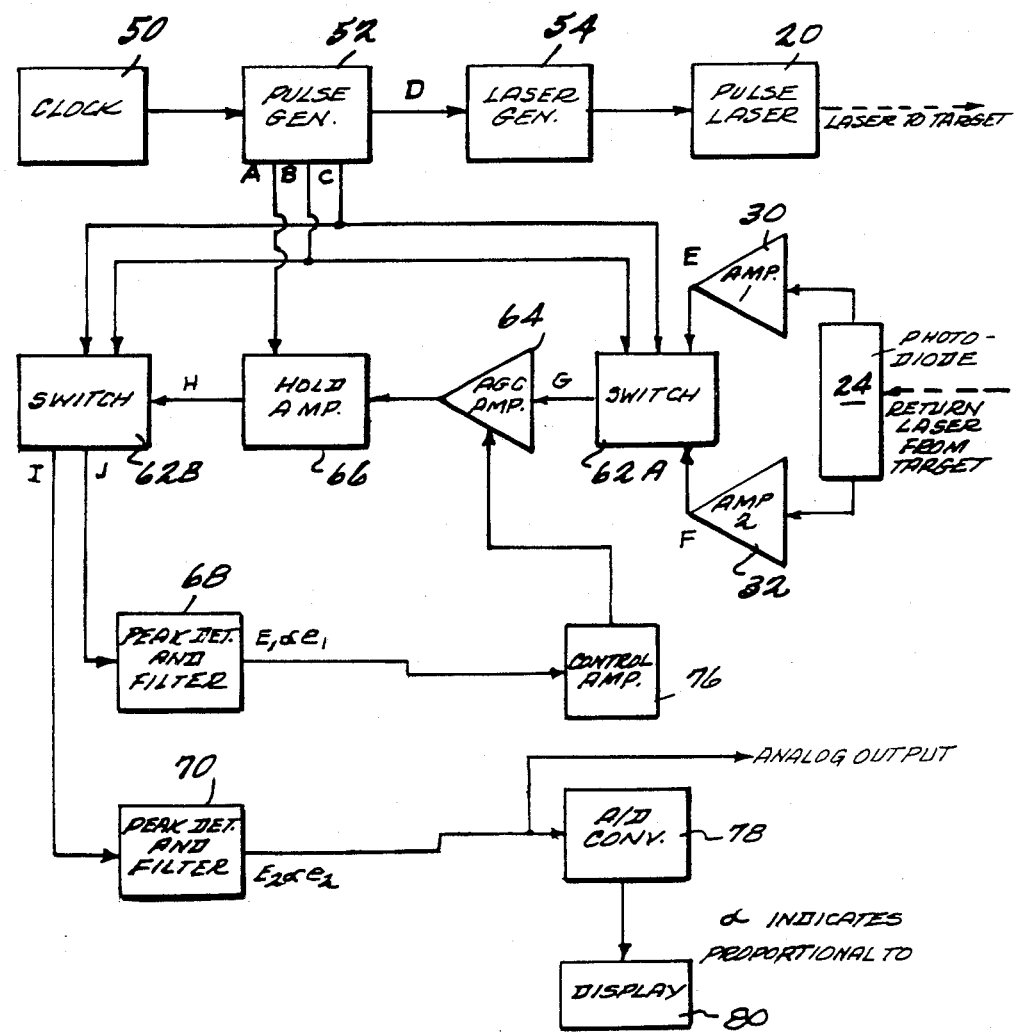
FIG. 8 shows a schematic view of another circuit for producing a signal indicating the linear position of the incident beam and hence the target distance.

Reference is now made to FIG. 8 which illustrates a further and preferred embodiment of the present invention. In this circuit, the current from one side of the photosensor is used to control an automatic gain control amplifier 64 so that the current is kept constant and, therefore, the current from the other side of the photosensor directly indicates the distance of the incident reflected radiation.

A conventional clock generating a basic timing square wave, as shown in FIG. 8, drives a pulse generator 52 which in turn triggers a conventional laser driver 54 so that the solid state laser 20 produces a sequence of pulses of approximately one microsecond at 500 pulses repetition. These pulses are directed to the target at which the bow is aimed as discussed above.

The returned pulses are received by photodiode element 24 and the two current signals produced at cathodes $K_1$ and $K_2$ respectively applied to amplifiers 30 and 32. Switch circuit 62A alternatively applies the outputs of amplifiers 30 and 32 to an automatic gain control amplifier 64 in accordance with the output of pulse generator 52 and as shown in FIG. 8.

The automatic gain control amplifier 64 is controlled by a signal produced from current $I_1$ of element 24, so that the signal representing the current $I_2$ indicates the distance to the target. AGC 64 also compensates for the wide range of beam intensities received resulting from different target reflectivities and distances.

The output of AGC amplifier 64 is applied to a hold amplifier 66 which as shown in FIG. 8 alternatively provides an output indicating the amplitude of the two currents from element 24. The hold signals are timed to the peak output of the return pulses. The use of a single hold circuit improves the circuit accuracy over one in which separate hold circuits are provided since there is no requirement to match the two hold circuits. The pulses are converted to a composite rectangular wave at the hold amplifier 66 and the signal separated by switch circuit 62 B into two rectangular waves proportional to the current signals from element 24. These two signals are then converted to d.c. levels at peak detectors 68 and 70. Since the d.c. level has a discontinuity at the sample gate, the d.c. outputs are also filtered by circuits 68 and 70. As noted above, the output of filter 68 is applied to control amplifer 76 which in turn controls automatic gain control amplifier 64 so that the output of filter 70 with appropriate offsets and scale factors indicates the distance to the target. The output of filter 70 is applied to an analog-to-digital conversion circuit 78 which converts the analog signal to a BCD output. The output of circuit 78 is applied to a conventional digital display 80 mounted on the unit and viewable to the archer to indicate precisely the distance to the targer at which he has aimed. Any suitable display in that regard can be utilized.

Many changes and modifications of the above-described embodiment of the invention can, of course, be carried out without departing from the scope thereof. Accordingly, that scope is intended to be limited only by the scope of the appended claims.

What is claimed is:

1. Apparatus for determining distance from a bow to a target comprising:
    means for producing a beam of collimated light;
    linear-shaped photosensitive means for producing an output signal indicating the linear position of an incident beam of reflected light;
    means for mounting said light producing means and said photosensitive means adjacent to each other on a bow so that said beam is reflected from a target to said photosensitive means when the bow is aimed at said target and the linear position of the incident beam on the photosensitive means varies with the distance to said target; and
    circuit means connected to said photosensitive means for receiving said output signal and producing an output indicating the distance to said target said circuit means including:
    (a) means for producing a train of clock pulses;
    (b) an automatic gain control amplifier;
    (c) switching means controlled by said clock pulses for alternatively applying first and second current signals to said automatic gain control amplifier;
    (d) a single hold circuit for receiving the output of said automatic gain control amplifier and controlled by said clock pulses to alternatively produce an output indicating the respective amplitudes of said first and second current signals;
    (e) a summing circuit for receiving said hold circuit output and controlling said automatic gain control circuit in accordance with said first current signal;
    (f) means for receiving said hold circuit output and producing an output indicative of said second current signal and therefore the position of the incident beam; and
    (g) means for displaying said output indicative of the position of the incident beam.

2. Apparatus as in claim 1 wherein said photosensitive means is a linear photodiode producing first and second current signals the amplitudes of which vary with the position of the incident reflected beam; and said circuit means includes means for producing an output which varies with the ratio of the difference of the amplitudes of said first and second current signals to the sum of the amplitudes of said first and second current signals.

3. Apparatus as in claim 1 wherein said beam producing means is a solid state laser.

4. An apparatus for determining distance from a bow to a target at which an arrow is aimed comprising:
    means for directing a beam of collimated light to said target;
    means for detecting the linear position of the reflected beam from said target on a photosensitive element;
    means for mounting said beam directing means and detecting means on a bow; and
    circuit means for determining the distance to said target from said linear position, said circuit means including:
    (a) means for producing a train of clock pulses;
    (b) an automatic gain control amplifier;
    (c) switching means controlled by said clock pulses for alternatively applying first and second current signals to said automatic gain control amplifier;
    (d) a single hold circuit for receiving the output of said automatic gain control amplifier and controlled by said clock pulses to alternatively produce an output indicating the respective amplitudes of said first and second current signals;
    (e) a summing circuit for receiving said hold circuit output and controlling said gain control circuit in accordance with said first current signal;
    (f) means for receiving said hold circuit output and producing an output indicative of said second current signal and therefore the position of the incident beam; and
    (g) means for displaying said output indicative of the position of the incident beam.

5. A circuit for producing an output signal indicating the position of a beam of radiation incident on a linear photodiode producing first and second current signals with the means of maintaining the first current constant so that the amplitude of the second current varies directly and linearly with the distance to the incident radiation comprising:
    means for producing a train of clock pulses;
    an automatic gain control amplifier;
    switching means controlled by said clock pulses for alternatively applying first and second current signals to said gain control amplifier;
    a single hold circuit for receiving the output of said gain control amplifier and controlled by said clock pulses to alternately produce an output indicating the respective amplitudes of said first and second current signals;
    a control citcuit for receiving said hold circuit output and controlling said gain control circuit in accordance with the first current amplitude;
    a position circuit for receiving said hold circuit output and producing an output indicating the amplitude of said second current signal and therefore the position of the incident beam; and
    means for displaying said position output indicative of the position of the incident beam.

6. A circuit as in claim 5 further including a laser driver circuit by said clock pulses.

7. A circuit as in claim 5, wherein said display means includes a digital display and an analog-to-digital converter connected to said digital display and to said position circuit.

8. A circuit as in claim 5 further including first and second peaking detecting means for each applying an output to said control circuit and to said position circuit and second switching means controlled by said clock pulse for alternately applying the output of said hold circuit to said peak detecting means.

* * * * *